March 25, 1952     A. C. JOHNSON     2,590,416
AIR HAY-DRYING APPARATUS AND METHOD OF MAKING SAME
Filed Aug. 21, 1947     2 SHEETS—SHEET 1
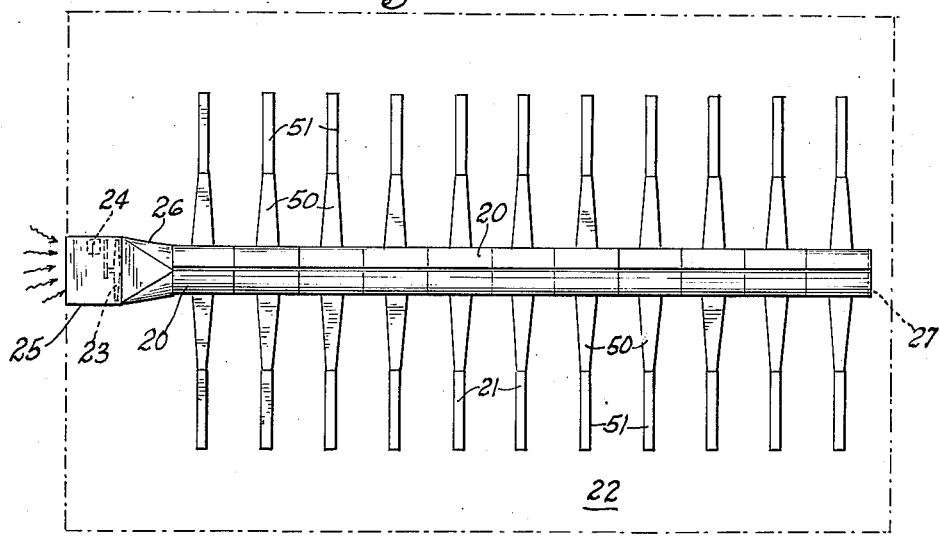
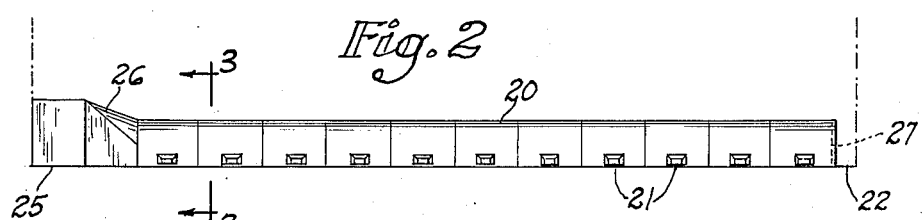
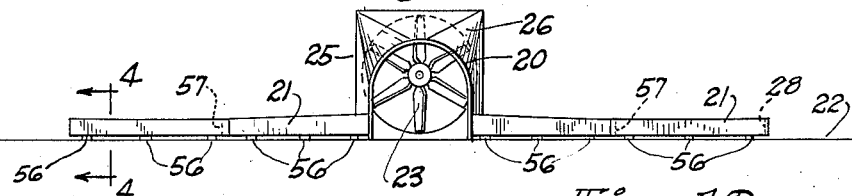
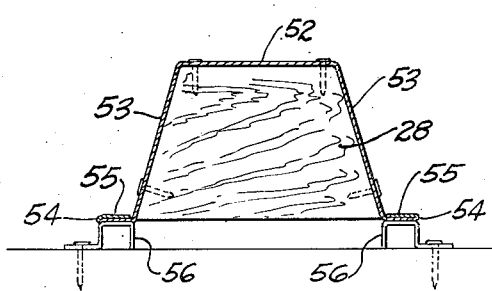
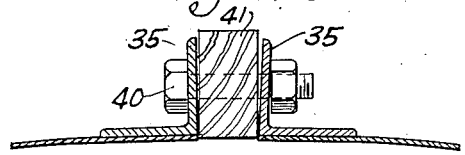
INVENTOR.
Albert C. Johnson
BY
Thiess, Olson & Mecklenburger
Attorneys March 25, 1952 A. C. JOHNSON 2,590,416
AIR HAY-DRYING APPARATUS AND METHOD OF MAKING SAME
Filed Aug. 21, 1947 2 SHEETS—SHEET 2
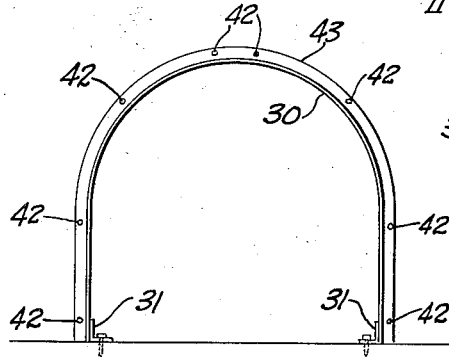
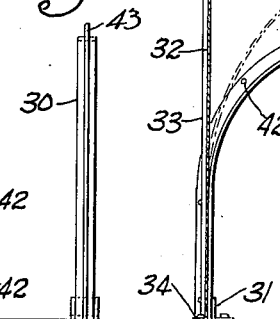
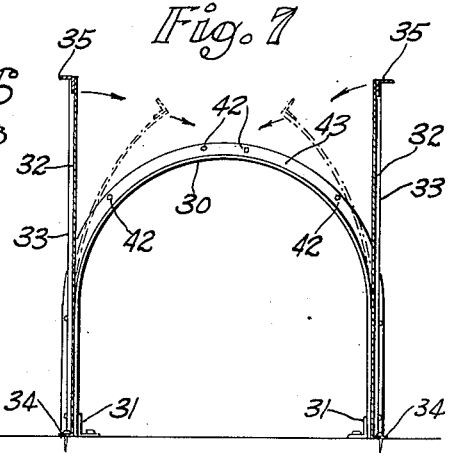
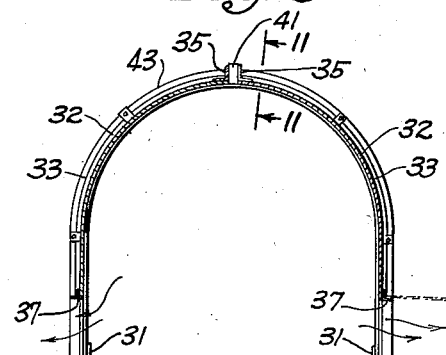
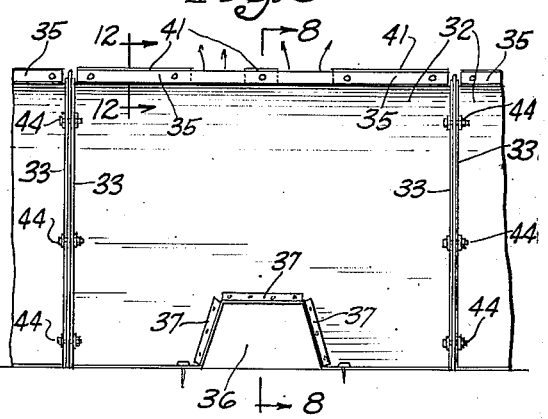
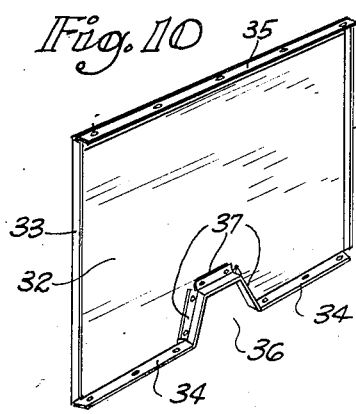
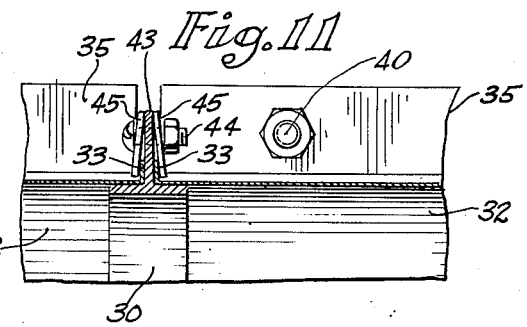
INVENTOR.
Albert C. Johnson
BY
Thiess, Olson & Mecklenburger
Attorneys Patented Mar. 25, 1952

2,590,416

UNITED STATES PATENT OFFICE 2,590,416

AIR HAY-DRYING APPARATUS AND
METHOD OF MAKING SAME

Albert C. Johnson, Fairfield, Iowa, assignor to
The Louden Machinery Company, Fairfield,
Iowa, a corporation of Iowa Application August 21, 1947, Serial No. 769,911

15 Claims. (Cl. 98—56)

This invention relates to air drying apparatus and method of making same for barns for the curing of hay in the mow, an object being to provide metal such as steel ducts capable of being made in sectional parts in the factory and which may be readily shipped, largely in the flat, and assembled and formed as installed by unskilled inexpensive labor in the barn where the apparatus is to be used.

A further object is the provision of hay drying apparatus for the mows of barns having main ducts and lateral ducts leading therefrom made in sections or units of sheet metal bent to form the sides and tops of the ducts and mountable end to end on the floor of the mow to form therewith the air ducts of the apparatus.

A further object is to make such main ducts by erecting on the floor of the mow metal bar arches and filling the space in between consecutive arches by two sheet metal panels bent thereover and together at the crown to form the metal walls of the duct.

Still further objects and advantages will appear from the description and claims to follow in connection with the accompanying drawings which show by way of illustration but not of limitation an apparatus embodying the invention, and in which Fig. 1 is a plan view of the apparatus as installed, showing the main duct and laterals and indicating their sectional or unit construction;

Fig. 2 is a side elevation of the same;

Fig. 3 is a sectional elevation of the apparatus taken on the plane indicated by the line 3—3 of Fig. 2;

Fig. 4 is a vertical section through one of the lateral ducts and taken on the line 4—4 of Fig. 3;

Fig. 5 is an elevational view of one of the supporting T-bar arches of the main duct and illustrates the start of the making and installation of the duct;

Fig. 6 is an edge view of the same;

Fig. 7 is a similar view of the arch with the two side sheet metal panels filling the space between arches and when bent into place the walls of the duct, and illustrating the next step of the installation and construction wherein after the arches are placed in position the side panels, preferably in flat sheet form, are placed against the arches at their lower parts and then bent over the arches toward each other at their upper parts, the arches serving as a form for such bending and forming operations;

Fig. 8 is a similar view showing the side panels in final place to complete the duct;

Fig. 9 is a side view of a section of the main duct and the connection of adjacent sections, and also showing the connection in a panel for a lateral duct;

Fig. 10 is a perspective view of a side sheet-metal panel in the flat;

Fig. 11 is a detail section, as on line 11—11 of Fig. 8, showing the manner of securing the ends of the side panels of the main duct sections to the T-bar arches; and Fig. 12 (Sheet 1) is a detail section on line 12—12 of Fig. 9, through the upper meeting edges of the side panels or the duct at the top.

As shown in Figs. 1, 2, and 3, the apparatus comprises the main duct 20 and smaller lateral ducts 21 mounted on the floor 22 of the mow of the barn. At one end of the main duct, a suitable blower or source of air pressure 23 is located, shown herein as a fan but which may be of any desired type, operated by an electric motor 24 or other power source, and if, as here shown, its enclosing casing 25 is larger than the main duct 20, it may be suitably connected therewith by the sloping section 26. The open ends of the main duct and of the lateral ducts may be closed by stop end wall members, such as that at 27 in the main duct and at 28, Fig. 4, in the laterals, and which may be of wood boards suitably formed and tacked or nailed in place, as indicated in Fig. 4; or in the case of end stop 27, several such strips may be suitably cleated together edge to edge to form the complete end stop, the top being curved to fit the arch and secured thereto, or it may replace the arch at that end, the side panels being nailed or tacked to the edge thereof.

Provision for the escape of the air into the hay in a distributed manner is made by suitably raising the laterals slightly above the floor by suitable clips or supports, and if desired, by providing suitable vents along the crown of the arch of the main duct, as will be described.

The main duct 20 comprises a series of sections or units and may be made of any desired length by adding or taking away such units or sections. These sections comprise supporting arches 30, preferably semicircular, of rolled steel T-bars, Figs. 5 to 9, at the ends thereof, the bars being bent to the desired cross section of the duct, the stem or web of the bar being on the outside of the arch. These arches are formed in the factory and are provided with angles 31 at their feet which may be welded thereto for tacking or nailing the same to the floor to secure the arches in position along the line of the duct.

The space between the arches is filled in by the side panels 32 of sheet steel, one on either side of each section, and are preferably formed in the flat at the factory and so shipped and delivered to the barn or place of installation and there placed in position, as indicated in Fig. 7, and bent over the arches or the flanges thereof as a form and secured thereto and together at the crown of the arch to form the complete walls of the metal duct.

Thus, Fig. 10, these panels 32, which are all alike, may consist of a single flat sheet of steel having end flanges 33 and bottom flanges 34 bent up at right angles to the sheet on one side of the same (the outside face of the sheet as installed in the duct). Another flange 35 at the top and on the same side of the sheet and preferably in the form of an angle bar welded thereto is provided. At the bottom of the sheet or panel, a recess is cut out to provide an opening 36 for a lateral duct 21. Supporting and joining flanges 37, preferably in the form of angle bars welded to the panel, align the sides and top of this opening 36 to receive the end of the lateral duct in the installation.

The end flanges 33 are of low height or narrow, so that when the plate or panel is installed and bent over the flanges of the arches the outer edges of the flanges 33 will lie inside the bolt holes in the webs or stems of the T-bar arches, that is, on the side of the holes toward the flanges of the bars, whereby, as later explained, the panels may be secured to the arches without the necessity of forming matching bolt holes in the flanges or the trouble of aligning them with the stem bolt holes in installing. The lower flanges 34 provide a wide footing for the panels on the floor and suitable holes may be punched therein for nailing or tacking the same to the floor.

The angle-iron flanges 37 about the opening for the lateral strengthen and give rigidity to the material of the panel at this point, and are wide enough to make good junctions under all circumstances with the lateral, which, as will be explained, simply fits down thereover and rests thereon without other attachment. They also support the lateral to any extent necessary, although, as will appear, the laterals have their own supporting clips slightly to elevate them above the floor. Besides, such spot-welded angle-iron flanges are economical of application to the panels and will retain their shape and form despite rough handling in shipping, installing, dismantling, and in long and hard usage.

The angle-iron or bar flanges 35 at the tops of the panels face each other when the panels are brought together over the arches and are firmly bolted together. They not only provide flanges for the sheets that will retain their form and shape under all conditions of rough usage but they strengthen the sheets and the whole duct. They form, in effect, the backbone of the duct structure, which in use may be subjected to tons of weight, not to mention the shocks due to dropping the hay, sometimes in bales, from high in the barn over the mow. These panel sheets in the particular duct shown, may be approximately 3¾ ft. by 4½ ft. in size and of 20 ga. sheet steel, but may be of any desired size according to the size of duct desired and other conditions. With the inherent strength of the sheets, the arch formation of the duct, the supporting T-bar arches and the angle-bar flanges at the crown, the duct successfully withstands the shocks, stresses and strains to which it may be subjected in use.

With the panels 32 thus formed, as indicated in Fig. 10, in the manufacturing plant, they are preferably not there bent into arch form but are kept in the flat until built into the duct at the place of installation. This results in easier handling, less room for storage and shipment, less shipping and delivery cost, and no labor or machinery cost for prebending. At the farm or place of installation, after the arches 30, or some of them, have been placed in position and nailed to the floor, the panels 32 are placed in upright position, one on either side of a section between two consecutive arches, as indicated in full lines in Fig. 7. The lower flanges 34 are nailed or tacked to the floor and then, preferably with a workman on either side of the section working simultaneously and pushing downwardly and inwardly on the upper flanges of the two panels, the panels, as indicated in dotted lines, are bent around the flanges of the T-bars as a form until the two upper edges of the panels and flanges 35 are brought substantially together at the crown of the duct arch, as shown in Figs. 8, 9, 11 and 12, where they may be firmly clamped together by suitable bolts 40.

At this point, provision is made for the escape or venting of some air from the main duct into the hay above, if the same be desired and for the amount desired. To this end, a thin wood filler strip 41 in one or more pieces or lengths may be placed between the flanges 35 and be clamped therein by the bolts 40. The spaces between the ends of these filler pieces provide the outlets for the air. If no such vent is desired, the fillers may be of full length of the panels or be omitted entirely, and if more vents than shown or different sizes of vents are desired they may be made by varying the lengths and number of the filler pieces accordingly. As here shown, there are two such outlets in the section between filler pieces 41, as seen in Fig. 9. However, whether the filler be present or not, the flanges 35 are secured together by the bolts 40.

In bringing the flanges 35 finally together and temporarily hold them while adjusting the fillers 41 in between and inserting the bolts 40 therethrough, it may be convenient to use an ordinary screw clamp over the two flanges to adjustably so hold them. Likewise, if the bolt holes in the opposed flanges do not quite align satisfactorily, an ordinary drift pin may be inserted through holes across from each other and the one or the other flange and panel jogged over a little to align the holes properly.

In order to secure the panels 32 and arches 30 together lengthwise, bolt holes 42 are formed in the stem 43 of the T-bar arches 30 just outside the end flanges 33 of the panels, as seen in larger scale in section Fig. 11. Suitable bolts 44 are passed through these holes and clip washers 45 are placed on the bolts, both under the head and the nut thereof, and are of sufficient size to overlap on their inner edges the flanges 33 of the panels. These washers or clips are preferably rectangular or flattened on their overlapping edges or of large enough size so that they may not work around to a non-gripping position. By tightening the bolts 44, the flanges 33 are tightly clamped to the stem 43 of the T-bar arch and the panels and arches are snugly and firmly secured together.

Thus, the main duct of the system is very quickly and economically made and installed. The floor of the mow on which the duct is erected should be relatively smooth and even and airtight. Suitable chalk lines placed thereon enable the arches readily to be placed in line at the proper distances apart and nailed or tacked thereto. The side panels 52 are stood erect at such section, one on either side, as shown in Fig. 7, and nailed or tacked to the floor. The upper edges of the panels are pressed inwardly and downwardly by the hands of a workman, preferably one on either side of the section, until the flanges 35 face each other at the crown, when the fillers 41 and the bolts 40 are slipped into place and the latter tightened to bring and hold the panels tightly together and on the flanges of the T-bar arches. In this operation of bending the panels over the flanges of the arches as a form, the end flanges 33 of the panel sheets stretch enough to accommodate the same. The bolts and washer clips are then applied to the stem of the arches and the end flanges of the panels and the panels and arches are all secured together. In such erection and making of the main duct, the same may be completed section by section, the arches being placed as needed, and sections may be added to lengthen the duct or taken away to shorten it at any time.

The laterals from a section of the main duct may be laid, if desired, as soon as a section of the main duct is completed. These laterals, as shown in Figs. 1 and 3, may be in sections also, two sections, 50 and 51, being indicated, though their number may be more or less, depending on the area to be covered, the obstructions that may be encountered in the mow, and so on. The first section 50 may be slightly tapering from end to end, as indicated, and the other, 51, or others uniform in cross section throughout.

These laterals, like the main duct panels are made of sheet steel and preferably of the same steel characteristics and thickness. A flat sheet cut to the right size is bent to form the inverted trough shape seen in cross section in Fig. 4, with flat top 52, sloping sides 53 and outwardly extending flanges 54 at the bottom. This bottom flange is preferably strengthened by reversely bending the outer edge portion 55 back upon the inner portion and flattening it down thereon, as shown in Fig. 4.

Escape of the air from these laterals into the mow is provided for by slightly raising them above the floor. Thus, small sheet-metal clips 56 may be bent into the form shown, spot-welded to the flanges 54, as indicated, and, resting upon the floor, raise the laterals slightly above it at their lower edges. About three of such clips, chairs, seats or blocks, as they may be variously termed, along each flange 54, as indicated in Fig. 3, suffice for each section of each lateral. These clips 56 may be nailed or tacked to the floor, as indicated in Fig. 4. The openings provided by the bent clips 56 allow the air freely to flow longitudinally in the laterals, whereas solid supports set up turbulent air currents that impede the free flow of the air along the lateral ducts.

The inner ends of the first sections 50 are of a size snugly to fit down over flanges 37 of the main duct panel 32 to make a close joint therewith. One man can readily apply it by first lowering the inner end of the section over the top flange 37 of the main duct and then lowering the raised outer end to the floor, meanwhile pushing it toward the main duct. No other fastening to the flanges 37 is required.

The outer sections 51 of the laterals are preferably placed on the floor with their inner ends slightly overlapping the outer ends of the inner sections, as indicated at 57 in dotted lines in Fig. 3. Though the outer section 51 is of substantially the same cross section and size as the outer end of the inner section 50, the ends will closely nest and overlap, as shown, in a satisfactory manner. The outer end of the outer section 51 is closed by the wood stop 28 before referred to.

The nailing or tacking of such laterals to the floor is optional and is more to prevent their accidental dislodgment than anything else, since the tons of hay piled thereon will effectually hold them down. Likewise, the nailing or tacking of the arches and side panels of the main duct is sufficient for the purposes, the weight of the hay serving to hold them down to the floor. Such light nailing or tacking is advantageous in case of the removal of the ducts from the mow as may be desired, either for using the system elsewhere or for dismantling it to clear the floor for other use, the parts thereof meanwhile being stacked together at one side.

The nature of the housing around the motor section 25 and the tapered portion 26 connecting such housing with the main duct 20 depends upon the type of fan used and its location with respect to the ducts. As here shown, the housing around the fan may consist of a rectangular wood framework with the sides suitably enclosed by wood, metal or other sheathing. The tapering portion 26 may comprise metal sheets cut, formed and welded or otherwise secured together suitably to join, funnel-like, the framework around the fan with the first arch of the main duct. The air compressor may be of the fan type as shown. Since these parts specifically are not considered a part of this invention, they are not shown in more detail.

The compressor or fan forces air into the main duct 20. From there it flows into the lateral ducts. Some of the air escapes through the orifices in the crown of the main duct in the hay above and the remainder flows under the edges of the laterals into the hay above. Thus, the air is well distributed through the mass of hay in the mow above. Close joints and connections are made throughout. With the low air pressures used in the ducts there is no appreciable leakage. However, if any does occur, the air will pass up into the hay and do good rather than harm. The amount of air required and the pressure to be produced in the apparatus is known in the art and depends, among other things, on the condition of the hay put into the mow. The fan must be of sufficient capacity and power to answer all requirements.

The operation of the apparatus will be clear from the foregoing, and the manner of constructing the ducts is also clearly set forth. It will be apparent that the invention affords a simple and relatively inexpensive steel duct air drying apparatus for barns with all the advantages of metal construction, which gives a better air flow because surfaces are smooth, corners rounded and no objectionable projections or protuberances in the ducts. It is of long life and withstands hard usage, and since it is only tacked down, is portable and easily removed. It is easily installed by unskilled and inexpensive labor and may be made and shipped in the flat, the laterals nesting together, and the other parts in similar compact bundles, all of which reduces the cost to the farmers and makes it readily available and quickly installable in the barns for use.

While but one embodiment of the invention is thus shown and described, it is apparent that various changes and alterations may be made therein without departing from the principle or

I claim:

1. A metal duct air hay-drying apparatus for mows of barns, comprising a duct having a plurality of spaced cross supporting arches of T bars with the stems of the bars on the outside of the arches, and two metal sheets one on either side filling the space between consecutive arches, said sheets being conformed to the arches and overlying and secured to the flanges and stems thereof and secured together along the crown of the arched duct so formed.

2. A metal duct air hay-drying apparatus for mows of barns, comprising a duct having a plurality of spaced cross supporting arches of T bars with the stems of the bars on the outside of the arches, two metal sheets one on either side filling the space between consecutive arches, said sheets being bent to conform to the arches and overlying and secured to the flanges and stems thereof, said sheets being secured together along the crown of the arch, and a filler piece or pieces between the edges of said sheets at the crown.

3. A metal duct air hay-drying apparatus for mows of barns, comprising a duct having a plurality of spaced cross supporting arches of T bars with the stems of the bars on the outside of the arches, two metal sheets one on either side filling the space between consecutive arches, said sheets being conformed to the arches and overlying the flanges thereof and having bent-up end flanges lying along the stems of the T arches, said stems having spaced bolt holes therethrough beyond the depth of said bent-up flanges, bolts therein, and washers on the bolts overlapping the said flanges whereby to clamp said sheets to the arches.

4. A sectional air duct for the drying of hay in the mow comprising T-bar supporting arches at the ends of the sections, the stems of the T bars being on the outer side of the arches, sheets of metal extending between consecutive arches to form walls of the duct, said sheets overlying the flanges of the T bars and having narrow outwardly bent flanges at said overlying ends lying along the stems of the bars of the said arches, bolts extending through said stems outside the said flanges, and clamping washers on the bolts overlapping said flanges on the sheets, whereby the sheets may be securely clamped to the arches by the tightening of the bolts.

5. A metal duct air hay-drying apparatus for mows of barns, comprising a duct in sections, circular top supporting arches at the ends of the sections, and sheets of metal between the arches of each section, said sheets of metal being bent over the arches as a form and secured thereto and together to form the side and top walls of the duct.

6. A sectional air drying duct for mows comprising T-bar arches defining the sections and secured to the floor, and sheet-metal panels placed one on either side of each section and extending between the arches thereof and over their flanges, the upper portions of said panels being bent inwardly over the said flanges as a form and secured thereto and together at their meeting edges to form the sides and top of the section.

7. In apparatus of the class described, a duct having a transverse angular bar support, sheets of metal for the walls of the duct each having bent-up edge flanges, the corner angles of the sheets and flanges nesting in the angle of the said bar, bolts through the bar beyond but adjacent the edge of said flanges when so nested, and clamping members on the bolts overlapping said flanges, whereby by tightening the bolts the sheets are clamped to the said bar.

8. A side and top wall panel for sheet-metal air ducts for hay-drying apparatus having transverse bar supports, comprising a rectangular sheet of metal, and edge flanges thereon for securing the sheets to said duct supports, a bottom flange thereon for resting on and attachment to the floor, and a top rail flange at the upper edge of the sheet, said sheet when applied to the duct extending over the said supports and secured thereto by the said end flanges and to an opposed like sheet by the said top flange rail forming therewith a ridgepole-like stiffening member in the top of the duct between said supports.

9. An air duct for hay drying in the mow comprising a series of transverse supporting arches and two sheet-metal panels one on either side to fill the gaps between consecutive arches and form the enclosing walls of the duct, said sheets being alike and each having end flanges for securing the sheet to the arches, bottom and top flanges and a flanged opening in the lower edge for connection with a lateral duct, all said flanges being on the outer face of the sheet when installed, said sheets being bent to the curvature of the arches in being installed and secured thereto and to the opposed sheet at the upper flange to form the duct.

10. A sectional air duct comprising a series of transverse supporting T-bar arches defining the cross section of the duct, sheet-metal panels extending between consecutive arches and forming the enclosing walls of the duct, said panels being secured at their ends to said arches, and angle bars secured to adjacent edges of the panels at and along the crown of the duct with their radially extending legs secured together and jointly forming a supporting and strengthening backbone for the panels and duct between arches.

11. A metal duct air hay-drying apparatus for mows of barns, comprising a duct in longitudinal sections, structural metal arch members for the ends of the sections forming the desired cross-sectional shape of the sides and top of the duct, each arch member comprising a pair of legs straddling the duct and a pair of feet one at the lower end of each leg, with their feet resing on the floor of the mow, and two metal sheets closing the space between the arches of each section one on each side of the section and both sheets secured to the arches at their end edges and secured together at their top edges, whereby the sections of the duct are formed and secured together to form the duct, each intermediate arch being secured on one side thereof to the adjacent ends of the two sheets on that side and on the other side thereof to the adjacent ends of the two sheets on said other side.

12. A metal duct air hay-drying apparatus for mows of barns, comprising a main duct and smaller lateral ducts leading therefrom, said main duct being in longitudinal sections, supporting arches of T-bar section at the ends of the sections, said arches being formed to the desired shape of the cross-section of the duct, each arch member comprising a pair of legs straddling the duct and a pair of feet one at the lower end of each leg, and supported on the floor of the mow, and two metal sheets at each section one on each side of the duct and fitting over the arches to close the space between the arches from floor to crown and secured together at the crown of the arch and at their ends to the flanges of the T arches, the stem of the T section arch extending between the end edges of those sheets on one side of the stem and the end edges of those sheets on the other side.

13. A sectional metal duct air hay-drying apparatus for mows of barns comprising a series of transverse supporting arches defining the cross section of the duct, each arch member comprising a pair of legs straddling the duct and a pair of feet one at the lower end of each leg, and having their lower foot portions engageable with the floor of the mow, sheet-metal panels extending between consecutive arches and forming the enclosing walls of the duct, there being two panels between each pair of adjacent arches having parallel adjacent side edges secured together and extending longitudinally along the upper portion of the duct, said panels being secured at their ends to said arches, and stiffening members along the adjacent side edges of the panels and secured thereto and jointly forming longitudinal strengthening and supporting members of the panels and duct between said arches.

14. A sectional metal duct air hay-drying apparatus for mows of barns comprising a series of transverse supporting arches defining the cross section of the duct, each arch member comprising a pair of legs straddling the duct and a pair of feet one at the lower end of each leg, and having their lower foot portions engageable with the floor of the mow, sheet-metal panels extending between consecutive arches and forming the enclosing walls of the duct, there being two panels between each pair of adjacent arches having parallel adjacent side edges extending longitudinally along the upper portion of the duct, said panels being secured at their ends to said arches, and angle bars secured to the adjacent side edges of the panels with their opposed transverse radially extending legs secured together and their other legs secured to said adjacent side edges, respectively, and jointly forming longitudinal strengthening and supporting members of the panels and ducts from arch to arch.

15. A sectional metal duct air hay-drying apparatus for mows of barns comprising a series of transverse supporting arches defining the cross section of the duct, each arch member comprising a pair of legs straddling the duct and a pair of feet one at the lower end of each leg, and having their lower foot portions engageable with the floor of the mow, sheet-metal panels extending between consecutive arches and forming the enclosing walls of the duct, there being two panels between each pair of adjacent arches having parallel adjacent side edges extending longitudinally along the upper portion of the duct, said panels being secured at their ends to said arches, angle bars secured to adjacent edges of the panels at and along the crown of the duct with their radially extending legs spaced apart and secured together and their other legs secured to said adjacent side edges, respectively, and jointly forming a supporting and strengthening ridge member for the panels and duct between arches, and spaced filler pieces between said legs providing air vents from said duct.

ALBERT C. JOHNSON.

REFERENCES CITED

The following references are of record in the file of this patent:

UNITED STATES PATENTS

| Number | Name | Date |
|---|---|---|
| 1,256,677 | French | Feb. 19, 1918 |
| 1,256,681 | French | Feb. 19, 1918 |
| 1,550,714 | Stacey, Jr. | Aug. 25, 1925 |
| 2,196,391 | Gronert | Apr. 9, 1940 |
| 2,374,894 | Pioch | May 1, 1945 |